Figure 1A:
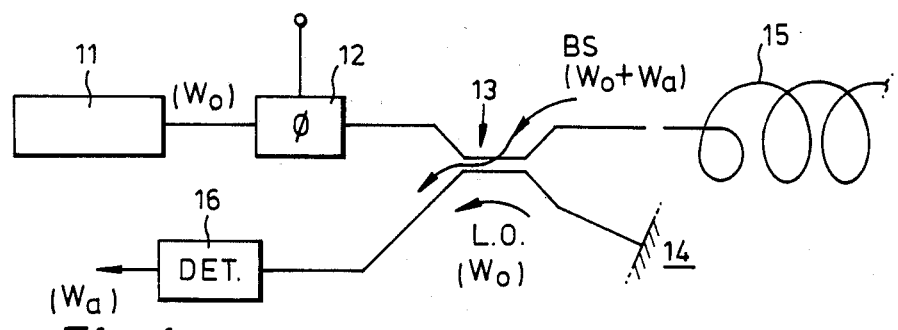

United States Patent [19]

Wright

[11] Patent Number: 4,674,872

[45] Date of Patent: Jun. 23, 1987

[54] COHERENT REFLECTOMETER

[75] Inventor: Stephen Wright, London, England

[73] Assignee: Standard Telephones and Cables Public Limited Company, London, England

[21] Appl. No.: 599,717

[22] Filed: Apr. 12, 1984

[30] Foreign Application Priority Data

Apr. 14, 1983 [GB] United Kingdom ............... 8310158

[51] Int. Cl.$^4$ .......................................... G01N 21/88
[52] U.S. Cl. ................................................ 356/73.1
[58] Field of Search ...................... 356/73.1, 237, 349, 356/5, 359; 250/227; 455/605, 611, 615, 616; 350/353, 96.15, 96.16; 372/26-28

[56] References Cited

U.S. PATENT DOCUMENTS

| | | | |
|---|---|---|---|
| 3,731,103 | 5/1973 | O'Meara | 356/5 X |
| 3,796,495 | 3/1974 | Laub | 356/359 X |
| 4,184,738 | 1/1980 | Wright | 350/96.15 X |
| 4,253,728 | 3/1981 | Venkatesan | 350/96.15 |
| 4,289,398 | 9/1981 | Robichaud | 356/73.1 |
| 4,411,520 | 10/1983 | Mochizuki et al. | 356/73.1 |
| 4,497,575 | 2/1985 | Philipp | 356/73.1 |

FOREIGN PATENT DOCUMENTS

| | | | |
|---|---|---|---|
| 1563993 | 4/1980 | United Kingdom | 356/73.1 |
| 2033078 | 5/1980 | United Kingdom | 356/73.1 |
| 2092743 | 8/1982 | United Kingdom | 356/73.1 |

Primary Examiner—Vincent P. McGraw
Attorney, Agent, or Firm—Dennis P. Clarke

[57] ABSTRACT

An optical reflectometer in which the output from a laser 11 is passed through a ramped phase modulator 12 and an optical fibre bi-directional coupler 13 to a transmission path 15, e.g. an optical fibre. Part of the light is coupled out to a mirror 14 and is reflected to form a local oscillator signal which is mixed in the coupler with backscattered light from the fibre. The mixed signals are applied to a detector 16.

11 Claims, 4 Drawing Figures $$\left(w_a = \frac{d\phi}{dt} = \frac{\phi_0}{\tau}\right)$$

COHERENT REFLECTOMETER

This invention relates to a method of effecting coherent reflectometry and to apparatus therefor.

Reflectometry is a technique for measuring loss and imperfections in transmission media. Optical reflectometry is particularly suitable for measuring the performance of optical fibre systems and for detecting breaks in fibres, and faults in fibre splices and couplings. In fibre reflectometry, one detects the continuous Rayleigh backscatter (from the microscopic inhomogeneities of the glass). A break is detected by the cessation of backscatter; the attenuation due to, say, a splice, is measured by the reduction in backscatter. Broken ends do not generally produce large reflections, but may do if the break is clean.

A coherent optical reflectometer is an apparatus in which pulses of coherent monochromatic light are launched into an optical fibre under test. Light reflected from the fibre is mixed with a reference light (hereinafter referred to as the local oscillator signal) and the mixed light is applied to a detector. Conveniently the source is a laser and the local oscillator signal is derived by coupling out a portion of the light from the source. *Electronics Letters*, 30th September 1982, Vol. 18, No. 20, at page 862 discloses a coherent optical reflectometer in which the source is a Helium-Neon laser the output of which is gated in an acousto-optic modulator to provide the pulses of light applied to the fibre under test. Reflected light from the fibre is coupled via a monomode directional coupler with unmodulated light from the laser and the mixed light is applied to the optical detector of a PIN FET receiver.

Reflectometry is a field where any improvement in sensitivity of the apparatus is valuable. A typical acousto-optic modulator is implemented as a bulk Bragg cell device with expanded beam optics and is difficult to engineer into a reliable portable instrument.

According to the present invention there is provided an optical reflectometer including a source of coherent monochromatic light, means for periodically modulating the light output of the source to provide pulses of light, an optical transmission path into which said light pulses are coupled, means for coupling out a portion of the light from the source to provide a local oscillator signal, means for mixing the local oscillator signal with light reflected from the optical transmission path, a detector to which the mixed light is applied, said periodical modulation of the source output being effected so as to cause ramped phase modulation of the light coupled into the optical transmission path.

Figure 1B:
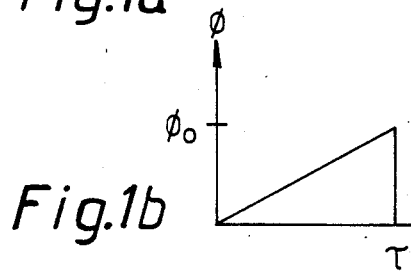
Figure 2:
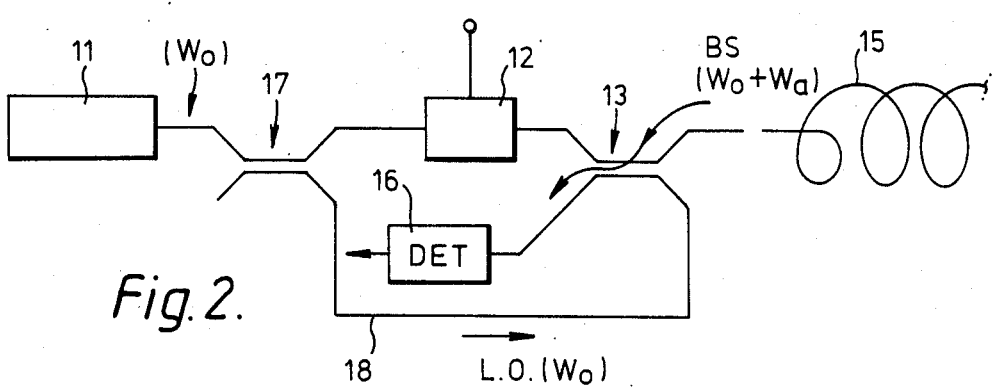
Figure 3:
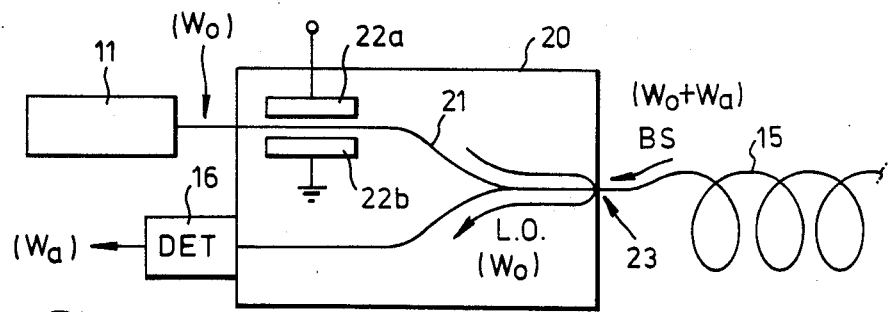

Embodiments of the invention will now be described with reference to the accompanying drawings, in which FIGS. 1–3 illustrate alternative optics reflectometer configurations, all utilising a phase modulator.

FIG. 1 shows a reflectometer configuration in which the output from a Helium-Neon laser 11 operated in a continuous wave mode is passed through a phase modulator 12 and is then applied to a bidirectional optical coupler 13. Part of the laser output is coupled out via a short length of fibre to a mirror 14. The rest of the laser output is launched into the fibre 15 which is under test. Backscatter light from the fibre under test is reflected through the coupler 13 where some of it is mixed with the light reflected from the mirror 14. The mixed light is applied to a detector 16. Thus, instead of gating a probe pulse with an acousto-optic modulator, according to the known method, the pulse can be labelled by shifting the signal beam $\omega_o$ by a frequency $\omega_a$ for a period $\tau$. Optical power is launched continuously down the fibre the backscatter signal $\omega_0 + \omega_a$ mixed with an unshifted local oscillator frequency $\omega_o$ at the detector. At the detector suitable filtering is incorporated to ensure that only signals arising from the frequency shifted pulses are processed further. Conveniently the frequency shift is obtained by continuously ramping the phase modulator over the time $\tau$. The frequency offset is then set by the rate of change of phase.

The use of piezoelectric transducers as the basis for relatively slow speed phase/frequency shifters in fibre optic systems is well known. These phase modulators generally take the form of a length of light guiding fibre wound around a radially expanding piezoelectric cylinder—a voltage applied across the piezoelectric produces an increase in radius of the cylinder, so stretching the fibre, causing a doppler phase shift (ideally linear with applied voltage) in light passing through the fibre. Similarly, a voltage ramp will produce a frequency shift in the light, proportional to the ramp rate.

In the coherent fibre-reflectometer, a single pulse (of a few micro-seconds or less) of light of a given frequency offset (within a defined bandwidth) is required. Producing such a pulse with a "perfect" phase modulator is easily envisaged: the application of a suitably short and steep voltage ramp would produce a constant frequency offset for the duration of the pulse. However, piezoelectrics do not behave perfectly—free standing in air they are mechanically highly resonant systems, with a Q of 100 and more. This inevitably causes problems at higher operating frequencies for phase shifters of any reasonable size. In practice, it is found that the simple phase modulator described above gives a poor response to any fast ramp with a duration approaching the period of the fundamental frequency of the piezoelectric cylinder. Even at much slower drive rates, there are pronounced ringing effects on the output of the phase modulator on any fast edge.

A pulse input generates a relatively slowly decaying sinusoidal response at the major resonance of the piezoelectric cylinder, but although absolute offset frequencies are large, practically, it is impossible to differentiate between frequency offsets produced on one resonant "swing" and its neighbours. For the present application, we require a single pulse of given frequency offset within a defined bandwidth.

Directly ramping the piezoelectric cylinder is not a viable method of producing such an offset, and the resonance excited by an electrical pulse is too slowly decaying for a single offset peak to be picked out. Therefore a modification to the simple piezoelectric phase phase shifter is proposed.

At resonance the phase modulator can produce very large frequency offsets. If a resonance can be excited and then damped sufficiently fast, a single peak offset of the required frequency can be obtained. The damped sinusoidal motion of the piezoelectric after the impulse enables one pulse of frequency offset light, centred at F & within bandwidth BW, to be picked out from the others by suitably band pass limiting the receiver.

This approach has the advantage also, that since the frequency offset required is produced by just the fastest part of one cycle of resonance, the frequency offset pulse duration can be much shorter than the response time of the piezoelectric cylinder.

Merely mechanical damping would result in a loss of efficiency (i.e. less F for same input)—to retain a reasonable responsivity a form of electrical and mechanical control of the resonance is called for.

The piezoelectric transducer has strong electromechanical coupling, but not strong enough to enable its motion to be electrically controlled (or even sufficiently damped) at frequencies near resonance. This is because the resonance is dominated by the mechanical properties of the piezoelectric material (density and bulk modulus). This implies that the phase modulator resonance needs to be electrically rather than mechanically dominated (i.e. the electrically stored part of the motion energy should be relatively increased, the mechanically stored part relatively decreased) to allow better control (since it is fairly easy to switch in electrical loss).

This is achieved through:

(i) making the phase shifter electrically resonant (at its previous open circuit resonant frequency) by connection of an inductor in series with the piezoelectric cylinder capacitance;

(ii) damping the mechanical motion of the cylinder by the introduction of an absorbing material around it (to act as a lossy transmission line—the absorbing material can be acoustically matched to the piezoelectric by loading with an appropriate proportion of dense particles (e.g. copper filings, lead shot etc).

The phase modulator is then driven as follows. From $t_o$ to $t_1$ the piezoelectric is charged slowly to operating voltage. From $t_1$ to $t_1$ the piezoelectric is rapidly discharged through an FET which goes closed circuit allowing the circuit to ring until at $t_2$, (ideally—in practice at $t_2$ the FET short circuits the piezoelectric, so removing energy stored electrically (and by passing resonant circuit) and also removes the electrical component of the stiffness component lowering the frequency of resonance, and increasing the damping effect.

The results of these modifications is an extremely fast reduction in maximum ramp rate of successive swings of the ringing produced by the step impulse, leading to a readily distinguishable pulse of frequency offset light at 10% BW (i.e. BW 10% of maximum frequency offset).

A practical arrangement consists of a piezoelectric cylinder 7.8 cm diameter×5 mm wall thickness×7.8 cm height, around which is wound 75 turns of 8 micron/125 micron standard 1.3 micron single mode system fibre. The whole of this is embedded in a mass of an elastomeric putty, such as is sold under the trade name "Blu Tack" (the absorbing medium), is housed in a sound proofed box, and is incorporated in one arm of a Fabry-Perot interferometer. With a 100 V operating voltage, a single pulse of 3.6 MHz frequency offset with a duration of 10 μS (fwhh) at 300 kHz receiver resolution was obtained.

An alternative configuration shown in FIG. 2 negates to a large extent the disadvantages of a non-ideal phase modulator. As before, the output of laser 11 is phase modulated by modulator 12 and applied via coupler 13 to the fibre 15 under test. In this case, however, the local oscillator signal is derived from the unmodulated laser output by a second coupler 17. The local oscillator signal is then taken via a short length of fibre 18 to coupler 13 where it is mixed with the backscatter light from the test fibre and the mixed signals are applied, as before, to detector 16. The local oscillator signal is now not corrupted by impairments in the phase modulator.

Whether a well-defined frequency offset can be produced with a phase modulator depends upon the response of the modulator. PZT cylinders wound with fibre are not ideal. However, with the advent of so-called "integrated optics" a new type of phase modulator has been developed. Phase modulators fabricated in lithium niobate ($LiNbO_3$) as part of an integrated optics package have a linear wide band response. Frequency shifts of up to 20 MHz are attainable by such devices. Note that FIG. 1 could also be implemented using a bulk $LiNbO_3$ (or $LiTaO_3$) phase modulator.

FIG. 3 illustrates an integrated coherent optics reflectometer using a phase modulator, the whole being fabricated in $LiNbO_3$. A block of LiNbOhd 3 20 has a Y-junction waveguide 21 formed in a surface region. Metallised electrodes 22a, 22b are formed on either side of one of the Y-junction branches to make a phase modulation structure. This branch is coupled to the output of a Helium-Neon laser 11. The stem of the Y-junction is coupled to the fibre 15 under test and the other branch of the Y-junction is coupled to the detector 16. Some of the laser output is reflected from the substrate/fibre interface 23 and forms the local oscillator signal $\omega_o$. Backscattered light ($\omega_o + \omega_a$) from the fibre is mixed with the local oscillator signal and the resultant signal is fed to the detector 16. Application of a ramp voltage across the metallised electrodes causes the required phase shift over the time $\tau$ to effect the frequency shift $\omega_a$. This reflectometer relies on having some mismatch at the substrate/fibre interface; too good an interface coupling will result in inadequate reflection of the local oscillator signal.

The foregoing embodiments utilise a single pulse of light shifted in frequency as the test signal. This is relatively inefficient in using available transmitter power, the single pulses being transmitted at a rate which results in a very large space/mark ratio. A swept frequency approach allows the transmitter to send out power continuously to the fibre. The frequency of the transmitter and the local oscillator are swept linearly and synchronously when the local oscillator is derived from the input power. A return from any given range cell will always be delayed by the same time, equal to twice the propagation time to the point of the backscatter reflection, with respect to the local oscillator signal. Mixing of the two signals at the detector will produce a signal with a particular intermediate frequency which can be identified with a particular delay corresponding to a range cell. For any given range cell power is continuously backscattered instead of only when the transmitted pulse passes through it.

A swept frequency signal can be obtained using a phase modulator in one of two modes. The ramp voltage applied to the phase modulator can be a parabolically increasing waveform or it can be driven with a repeated ramp ($2\pi$ amplitude) and sweeping the period of the ramp to sweep the frequency.

I claim:

1. An optical reflectometer including a source of coherent monochromatic light, optical phase modulation means for periodically ramp phase modulating the light output of the source to provide pulses of frequency shifted light, an optical transmission path into which said light pulses are coupled, means for coupling out a portion of the light from the source to provide a local oscillator signal, means for combining the local oscillator signal with a signal constituted by light reflected from the optical transmission path, a detector to which these combined optical signals are applied.

2. A reflectometer according to claim 1 characterised in that the light is coupled into the transmission path by a bi-directional fibre-optic coupler, whereby some of the light from the source is coupled into the transmission path and some of the light is coupled into a reflection path the reflected light from which forms the local oscillator signal to be combined in the bi-directional coupler with backscatter light from the transmission path, the combined optical signals being applied to the detector.

3. A reflectometer according to claim 1 characterised in that part of the unmodulated light from the source is coupled out by a fibre optic coupler to form a local oscillator signal, the remainder of the source light being applied to a phase modulator the output of which is coupled into the transmission path via a bi-directional fibre optic coupler, backscatter light from the transmission path and the local oscillator signal both being combined in the bi-directional coupler, the combined optical signals being applied to the detector.

4. A reflectometer according to claim 1 characterised in that an optical Y-junction light guide is formed in a substrate body of electro-optic material, that an integrated optics phase modulator is formed on one of the branches of the Y-junction, said one branch being coupled to the light source, the other branch of the Y-junction being coupled to the detector and the stem of the Y-junction being coupled to the transmission path via a partly-reflecting interface whereby some of the light from the source is reflected at the junction to form a local oscillator signal combined with backscatter light from the transmission path, the combined optical signals being applied to the detector via said other branch of the Y-junction.

5. A reflectometer according to claim 1 characterised in that the phase modulator comprises a length of optical fibre attached to a body of piezoelectric material whereby application of an electric field to the body causes expansion thereof and hence stretching of the optical fibre.

6. A reflectometer according to claim 5, characterised in that the phase modulator includes means for applying the electric field to the body, said means including an inductor connected electrically in series with the piezoelectric body capacitance, means for applying an electric current to the piezoelectric body whereby the piezoelectric material is charged to a predetermined operating voltage, and means for discharging the charged body by applying a short circuit across the piezoelectric body.

7. A reflectometer according to claim 5, characterised in that the phase modulator incorporates a mechanical damping medium comprising a mass of absorbing material within which the piezoelectric body is embedded, the material being acoustically matched to the piezoelectric body.

8. A reflectometer according to claim 1 characterised in that the phase modulation is effected by applying a periodical ramp voltage to the modulation means.

9. A reflectometer according to claim 8, characterised in that the voltage ramp is linear.

10. A reflectometer according to claim 8, characterised in that the voltage ramp is a parabolically increasing waveform.

11. A reflectometer according to claim 8, characterised in that the ramp voltage is applied as repeated sequences of contiguous ramps of equal amplitude the periods of which are swept to effect a swept frequency of the modulated light output.

* * * * *